(12) United States Patent
Mehta et al.

(10) Patent No.: US 8,973,082 B2
(45) Date of Patent: Mar. 3, 2015

(54) INTERACTIVE PROGRAM SYSTEM (75) Inventors: Japan Mehta, Coppell, TX (US); Shafiq Kassam, Lewisville, TX (US); Enrique Ruiz-Velasco, Flower Mound, TX (US); Srirama R. Kalidindi, Flower Mound, TX (US); Arjun Baskaran, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 264 days.

(21) Appl. No.: 13/281,524

(22) Filed: Oct. 26, 2011

(65) Prior Publication Data

US 2013/0111515 A1 May 2, 2013

(51) Int. Cl.
| | |
|---|---|
| *H04N 7/16* | (2011.01) |
| *H04N 7/173* | (2011.01) |
| *H04N 7/01* | (2006.01) |
| *H04N 11/20* | (2006.01) |
| *H04L 29/08* | (2006.01) |
| *H04N 21/435* | (2011.01) |
| *H04N 21/475* | (2011.01) |
| *H04N 21/4782* | (2011.01) |
| *H04N 21/8545* | (2011.01) |
| *H04W 4/18* | (2009.01) |

(52) U.S. Cl.
CPC .......... *H04L 67/141* (2013.01); *H04N 21/4355* (2013.01); *H04N 21/4756* (2013.01); *H04N 21/4782* (2013.01); *H04N 21/8545* (2013.01); *H04W 4/18* (2013.01); *H04L 67/04* (2013.01)
USPC ............... 725/136; 725/51; 725/61; 725/109; 725/112; 725/115; 725/133; 725/110; 725/40; 348/441

(58) Field of Classification Search
USPC ......... 725/24, 51, 60, 61, 109, 112, 115, 118, 725/133, 136, 110, 40; 715/746; 348/441; 709/203
See application file for complete search history.

(56) References Cited

U.S. PATENT DOCUMENTS

| | | | | |
|---|---|---|---|---|
| 8,341,669 | B2 * | 12/2012 | Lau et al. .................... | 725/39 |
| 8,396,055 | B2 * | 3/2013 | Patel et al. .................... | 370/352 |
| 8,799,974 | B2 * | 8/2014 | Karunakaran et al. ........ | 725/109 |
| 2004/0139480 | A1 * | 7/2004 | Delpuch et al. ............... | 725/135 |
| 2006/0130120 | A1 * | 6/2006 | Brandyberry et al. ........ | 725/136 |
| 2010/0060802 | A1 * | 3/2010 | Huegel ......................... | 348/734 |
| 2010/0088720 | A1 * | 4/2010 | Koerner ......................... | 725/34 |
| 2010/0162343 | A1 * | 6/2010 | Roberts et al. ................ | 725/136 |
| 2011/0090898 | A1 * | 4/2011 | Patel et al. .................... | 370/352 |
| 2012/0159528 | A1 * | 6/2012 | Toney, Jr. ..................... | 725/14 |
| 2012/0174155 | A1 * | 7/2012 | Mowrey et al. ................ | 725/40 |
| 2013/0007576 | A1 * | 1/2013 | Lund et al. .................... | 715/203 |

\* cited by examiner

*Primary Examiner* — Pinkal R Chokshi (57) ABSTRACT

An interactive program system includes a device that receives program data and Enhanced TV Binary Interchange Format (EBIF) data associated with an interactive application; identifies the EBIF data; converts the EBIF data to a data format compatible with a user device; generates an EBIF notification based on the EBIF data; transmits the EBIF notification to the user device; and transmits the converted EBIF data to a network device. The user device communicates with the network device based on the EBIF notification and displays the converted EBIF data. The user device transmits input data to the network device and the network device provides interaction data to the device.

19 Claims, 9 Drawing Sheets

INTERACTIVE PROGRAM SYSTEM

BACKGROUND

Enhanced TV Binary Interchange Format (EBIF) is an application content format for use in interchanging, decoding, and rendering enhanced television (ETV) or interactive television (ITV) applications. According to one specification, user agents decode and instantiate applications, interpret and render the presentation constructs, and execute the logic programming constructs specified by the applications.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "program" includes video and/or audio content. A program may include, for example, a local program, a national program, a television show, a movie, a sporting event, a news program, a musical event, a shopping program, a pay-per-view program, a video-on-demand program, a commercial, or an audio program (e.g., a program that plays music, a music channel that is of a particular musical genre, etc.).

According to an exemplary embodiment, a computational device receives a stream to distribute to a user device for user consumption. According to an exemplary embodiment, the stream includes EBIF data. According to an exemplary embodiment, the computational device includes an EBIF agent that identifies the EBIF data within the stream and converts the EBIF data to a format understandable to the user device. For example, the EBIF agent parses the stream to identify the presence of EBIF data and converts the EBIF data to Web components, such as, Hypertext Markup Language (HTML) components, JavaScript components, etc.

According to an exemplary embodiment, the EBIF agent generates a notification that includes a Uniform Resource Identifier (URI), such as Uniform Resource Locator (URL), and a session identifier. The EBIF agent transmits the notification to the user device. According to another embodiment, the EBIF agent generates a notification that includes a port number and a network address (e.g., an Internet Protocol (IP) address, etc.). The EBIF agent transmits the notification to the user device. According to an exemplary embodiment, the EBIF agent provides the Web components to a Web service (e.g., a Web server) or some other network device (e.g., a Transmission Control Protocol (TCP) server, a User Datagram Protocol (UDP) server, a server, etc.).

According to an exemplary embodiment, the user device receives the notification and establishes a session with the Web service or other network device. The user device renders a user interface based on the Web components. A user interacts with the user interface via the user device. According to an exemplary embodiment, the Web service captures the user interaction(s) (e.g., user selection(s)) and transmits user interaction data to the EBIF agent (e.g., via a Web service call).

According to an exemplary embodiment, the EBIF agent interprets the interaction data. Depending on the interactive application, the computational device (e.g., the EBIF agent) may transmit a response to the user device (e.g., providing the user device with a new URL, a session identifier), update the Web components with new data, or transmit the interaction data to another device. For example, if the interactive application is a voting application or a polling application, the computational device transmits the user's vote or selection to a device collecting user votes or selections.

As a result of the foregoing, the EBIF agent includes an intelligence to recognize the capabilities of the user device and translate EBIF data according to such capabilities. Additionally, the EBIF agent works with user device applications to initiate and maintain sessions with the EBIF agent and the Web service. The EBIF agent also ensures that the interactive television experience is seamless to the user.

While exemplary embodiments provided in this description may be implemented based on the use of a particular protocol, language, platform, etc., such implementations are not intended to be restrictive or provide an exhaustive treatment, as such. In other words, the embodiments described herein may be implemented using other suitable protocols, languages, platforms, etc., which may not be specifically described.

Figure 1:
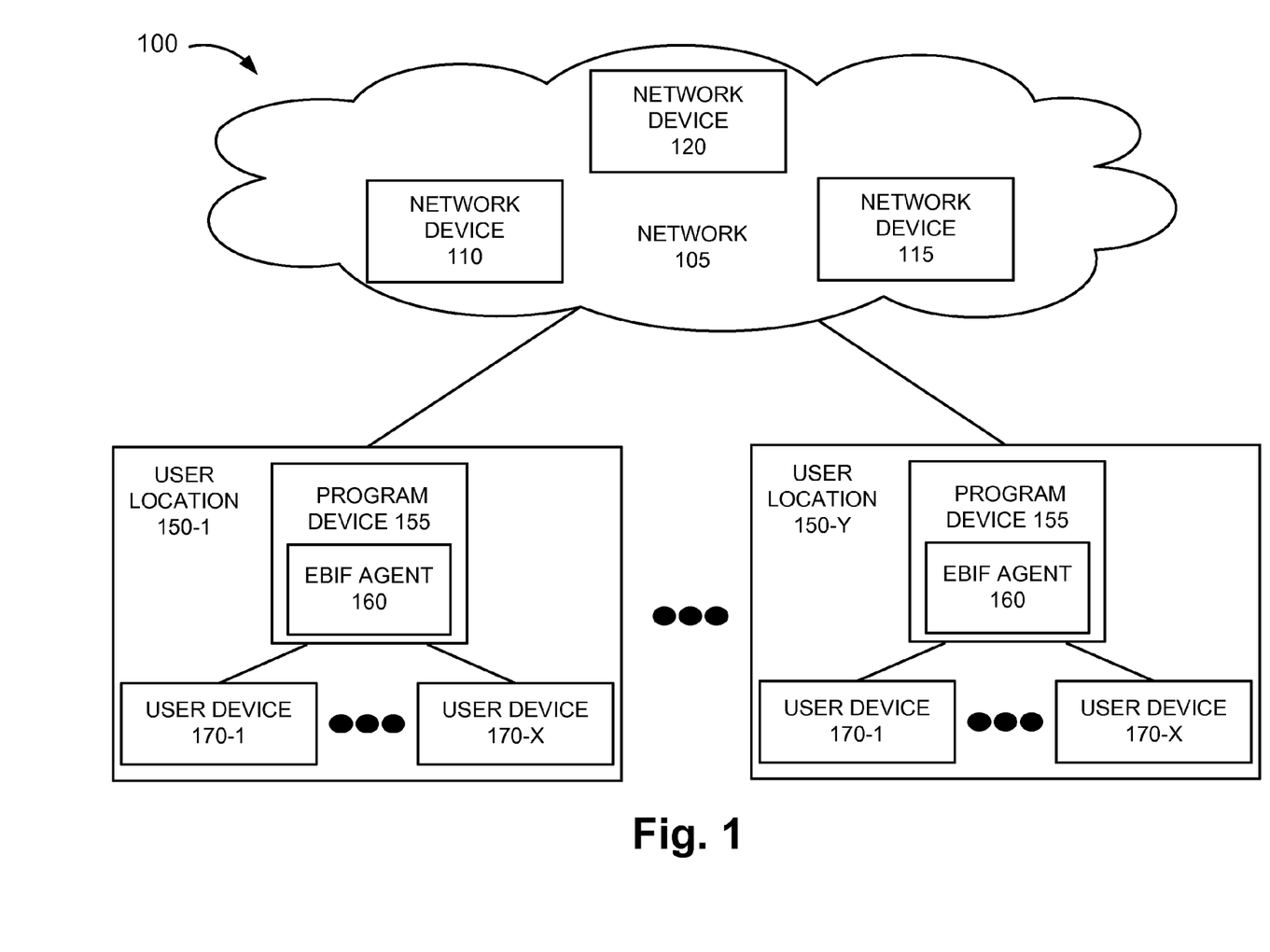
FIG. 1 is a diagram illustrating an exemplary environment in which an exemplary embodiment of an interactive program system may be implemented.

FIG. 1 is a diagram illustrating an exemplary environment in which an exemplary embodiment of an interactive program system may be implemented. As illustrated, environment 100 includes a network 105 that includes, among other devices, a network device 110, a network device 115, and a network device 120. Environment 100 also includes user locations 150-1 through 150-Y, in which Y>1 (referred to collectively as user locations 150 and individually as user location 150). User locations 150 include a program device 155. Program device 155 includes an EBIF agent 160. User locations 150 also include user devices 170-1 through 170-X, in which X>1 (referred to collectively as user devices 170 or individually as user device 170).

The number of devices and networks, and the configuration in environment 100 are exemplary and provided for simplicity. According to other embodiments, environment 100 may include additional devices, fewer devices, different devices, and/or differently arranged devices, than those illustrated in FIG. 1. Additionally, or alternatively, environment 100 may include additional networks and/or differently arranged networks, than those illustrated in FIG. 1.

According to other embodiments, a single device in FIG. 1 may be implemented as multiple devices and/or multiple devices may be implemented as a single device. By way of example, program device 155 and network device 120 may be combined into a single device. A device may be implemented according to a centralized computing architecture or a distributed computing architecture. Additionally, a device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices. Environment 100 may be implemented to include wired and/or wireless connections among the devices illustrated.

Network 105 includes a network that provides programs to users. For example, network 105 includes a program delivery network. The program delivery network may provide at least one of a television service, a mobile service, or an Internet service. Network 105 may correspond to a satellite-based network and/or a terrestrial-based network. For example, network 105 may be implemented as a program streaming network, a distribution network associated with a television delivery system, a mobile network, or the Internet. Although not illustrated, network 105 may include, for example, billing devices, application servers, security devices, routing devices, program source devices, etc.

Network device 110 includes a device that transmits programs to user locations 150. For example, network device 110 may include a broadcast streamer. According to an exemplary embodiment, network device 110 transmits program data and EBIF data. For example, network device 110 may transmit data according to a Moving Pictures Experts Group (MPEG) transport stream format. Network device 110 may be implemented as, for example, a computational device (e.g., a computer), a server (e.g. an application server, etc.), or other suitable network device.

Network device 115 includes a device that receives user interaction data. For example, network device 115 may be implemented as a response server, a voting server to obtain votes from users, a polling server to obtain opinions from users, or some other type of device hosting a service (e.g., a social network server, etc.). Network device 115 may be implemented as, for example, a computational device (e.g., a computer), a server (e.g., an application server, etc.), or other suitable network device.

Network device 120 includes a device to provide user devices 170 with converted EBIF data for rendering of a user interface. For example, network device 120 may be implemented as a server (e.g., a Web server, a UDP server, a TCP server, etc.), a Web service, a computational device (e.g., a computer), or other suitable network device.

User location 150 is a location of a user(s). For example, user location 150 may be a residence, a place of business, etc. Program device 155 includes a device that interfaces with network 105 and user device 170. For example, program device 155 receives program data and EBIF data from network device 110. Program device 155 provides the program data to user device 170. Program device 155 (e.g., EBIF agent 160) also performs other processes pertaining to the EBIF data, as described herein. Program device 155 may be implemented as, for example, a computational device (e.g., a computer), a server (e.g., a media server, etc.), a set top box, or other suitable device. The term "set top box" may include, for example, a client device, a server device, a converter box, a television receiver, a tuner device, a digibox, and/or some other type of device that receives program signals. According to an implementation, user device 170 and/or program device 155 may be implemented as a set top box in which program device 155 includes EBIF agent 160 and is able to communicate with various user devices 170 either directly, or via other devices (e.g., a wireless router, etc.), as described herein.

EBIF agent 160 is a component of program device 155 that performs processes pertaining to, among other things, EBIF data, as described herein. For example, EBIF agent 160 identifies EBIF data within a program data stream or broadcast. EBIF agent 160 converts the EBIF data to a format that is compatible with user device 170. EBIF agent 160 also generates notifications, manages user interaction data, etc., as previously described and further described below. According to an exemplary embodiment, EBIF agent 160 or program device 155 includes multiple tuners to connect to multiple program transmissions and provide a program service to user devices 170.

User device 170 includes a device that communicates with network 105 via program device 155. For example, user device 170 may be implemented as a wireless device (e.g., a smartphone, etc.), a tablet device, a personal digital assistant (PDA), a personal communication system (PCS), etc. User device 170 may be implemented as a display, such as a television, a set top box, and a remote control device. User device 170 may be implemented as a computer (e.g., a desktop computer, a laptop computer, a palmtop computer, a netbook, a smart phone, a tablet device, etc.), a game system (e.g., a PS3® device, etc.), etc. User location 150 may include other devices not specifically illustrated, such as, a wireless router, etc. According to an exemplary implementation, if network device 110 is implemented as a media server, user device 170 includes a media client.

Figure 2A:
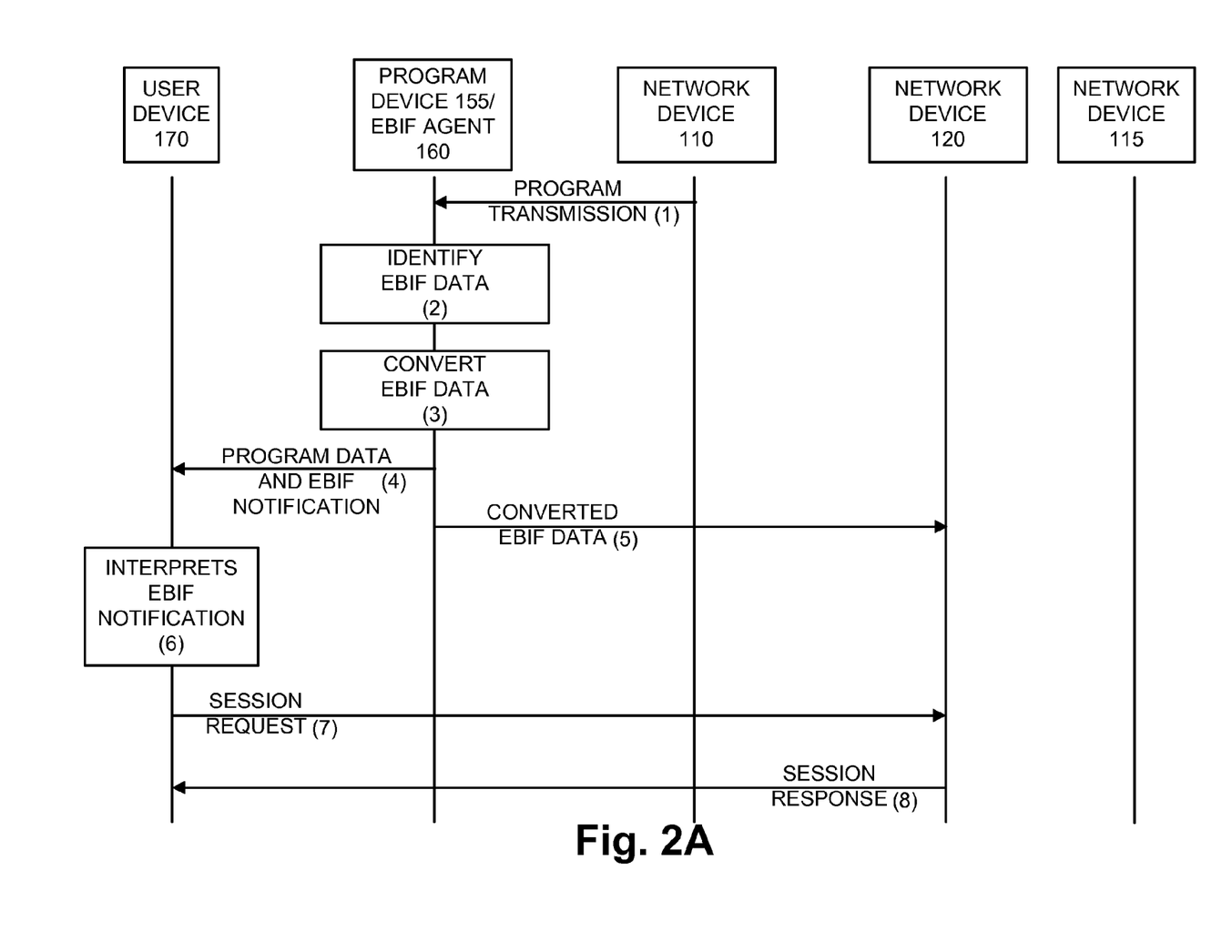
FIGS. 2A and 2B are messaging diagrams pertaining to an exemplary process performed by an exemplary embodiment of an interactive program system.
Figure 2B:
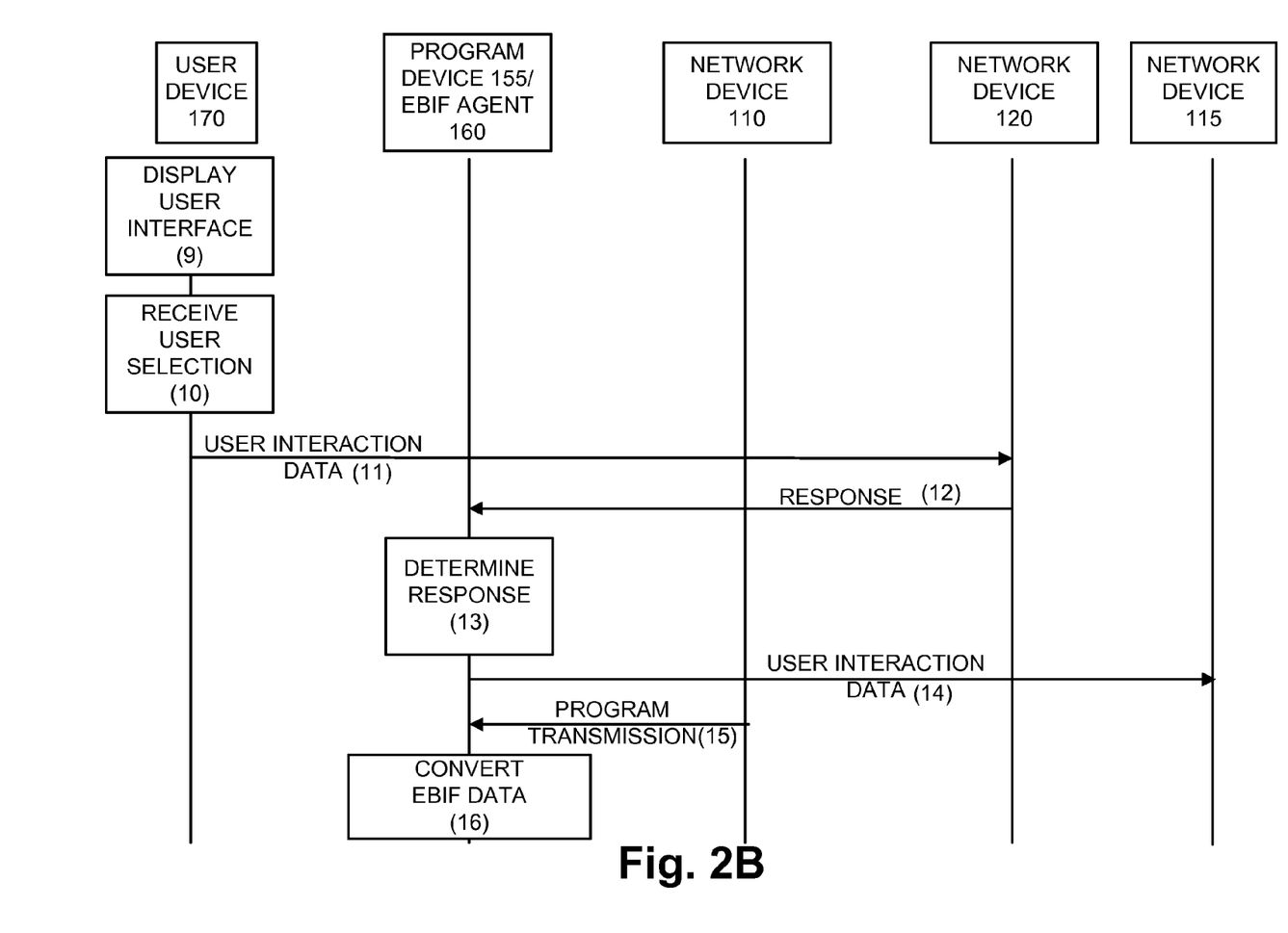

FIGS. 2A and 2B are messaging diagrams pertaining to an exemplary process performed by an exemplary embodiment of the interactive program system based on EBIF data. The exemplary process is described in relation to the devices illustrated in environment 100 of FIG. 1. For purposes of description, it may be assumed that user device 170 has established a connection with program device 155. For example, user device 170 may establish a connection with program device 155 based on a discovery process. According to an exemplary implementation, as described further below, program device 155 may obtain user device information pertaining to user device 170 during a connection process. Referring to FIG. 2A, in step (1), network device 110 transmits a program transmission to program device 155/EBIF agent 160. The program transmission includes program data and EBIF data. The program transmission may be, for example, a broadcast transmission or a multicast transmission using the Internet Protocol (IP) over a wireless medium or a wired medium (e.g., cable, optical, etc.). In step (2), program device 155 receives the program transmission via tuners. EBIF agent 160 listens and identifies the presence of EBIF data in the program transmission. For example, a transport stream may include MPEG packets. An MPEG packet may include an EBIF Packet Identifier (PID) or data descriptor in a suitable field of the MPEG packet to indicate the presence of EBIF data.

In step (3), EBIF agent 160 performs a real-time transcoding of the EBIF data into data format(s) that is/are compatible for user device 170. The EBIF agent 160 may identify the data format(s) compatible for user device 170 based on, for example, the channel used by the program transmission and/or user device information obtained during a connection process between user device 170 and program device 155. For example, the connection process may include authentication and authorization in which user device information, such as, the type of user device (e.g., a smartphone, an iPAD® device, a set top box, etc.), an equipment identifier, user device capabilities, etc., are provided over a particular connection channel. The user device capability information may include information pertaining to, for example, languages supported by user device 170. Based on this information, which is stored by program device 155, EBIF agent 160 converts the EBIF data into data format(s) that is/are compatible for user device 170. For example, EBIF agent 160 may convert the EBIF data into HTML component(s), JavaScript component(s), Dynamic HTML components, Cascading Style Sheet (CSS) components, HTML5 components, Lua components, Bright Script components, and/or other compatible components.

Figure 3A:
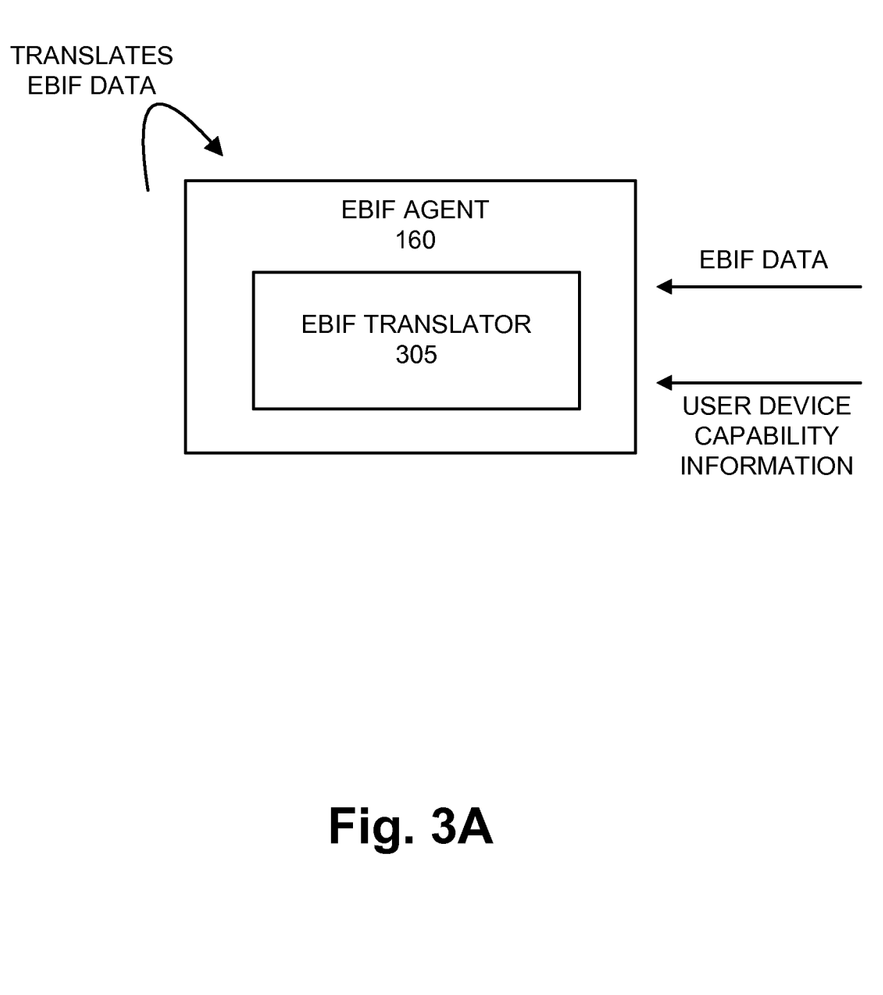
FIG. 3A is a diagram illustrating an exemplary process for translating EBIF data.

FIG. 3A is a diagram illustrating an exemplary process performed by EBIF agent 160 to translate EBIF data. According to an exemplary embodiment, EBIF agent 160 includes an EBIF translator 305. EBIF translator 305 translates EBIF data into formats compatible with user device 170, as previously described. For example, EBIF translator 305 parses the EBIF data based on the EBIF and translates the EBIF data. According to this example, EBIF agent 160 provides the EBIF data to EBIF translator 305. EBIF translator 305 also obtains user device capability information. EBIF translator 305 selects the data format(s), scripting language(s), etc., which are compatible for user device 170. EBIF translator 305 translates the EBIF data to the selected format(s), languages, etc. EBIF translator 305 performs the translation in real-time. According to an exemplary implementation, EBIF agent 160 (e.g., EBIF translator 305) may not perform a translation for specific devices. By way of example, assume program device 155 is implemented as a set top box and user device 170 is implemented as a television, which is connected to the set top box. Program device 155 may omit translating EBIF data. Rather, the EBIF data may be displayed on the television without converting the EBIF data. According to another example, assume program device 155 is implemented as a set top box and user device 170 is a smartphone, which is connected to (e.g., communicatively coupled to) the set top box. Program device 155 may convert the EBIF data.

Referring to FIG. 2A in step (4), program device 155 transmits the program data to user device 170. In addition, EBIF agent 160 generates an EBIF notification and transmits the EBIF notification to user device 170. According to an exemplary embodiment, the EBIF notification includes a URL that is hosted by network device 120. In addition, according to an exemplary implementation, the EBIF notification includes a session identifier (also known as a session token) having a time-to-live. According to another embodiment, the EBIF notification includes a port number (e.g., a port associated with network device 120, a port of user device 170, or both) and a network address (e.g., a network address associated with network device 120). In step (5), EBIF agent provides the converted EBIF data to network device 120.

In step (6), user device 170 receives the program data and the EBIF notification and interprets the EBIF notification. In response thereto, in steps (7) and (8), user device 170 establishes a session with network device 120 based on the URI and the session identifier. Alternatively, in steps (7) and (8), user device 170 uses the port number and the network address to listen, for example, for unicast or multicast communications to establish a session or makes a connection with network device 120 based on the port and network address. Network device 120 may use the session identifier, among other reasons, as a security measure to prevent unauthorized or malicious activity.

Referring to FIG. 2B, in step (9), user device 170 displays a user interface based on the converted EBIF data hosted by network device 120. For example, user device 170 receives the converted EBIF data and renders a user interface. For example, user device 170 includes a browser or other suitable application to display the user interface. In this example, the user interface is interactive and user device 170 receives a user selection of a graphical element displayed in the user interface, in step (10). In step (11), user device 170 transmits the user selection (e.g., interaction data) to network device 120. In step (12), network device 120 transmits a response to program device 155. According to an exemplary embodiment, the response includes the interaction data. According to an exemplary implementation, the response includes an identifier associated with user device 170 to permit EBIF agent 160 to recognize that the interaction data stems from user device 170.

Figure 3B:
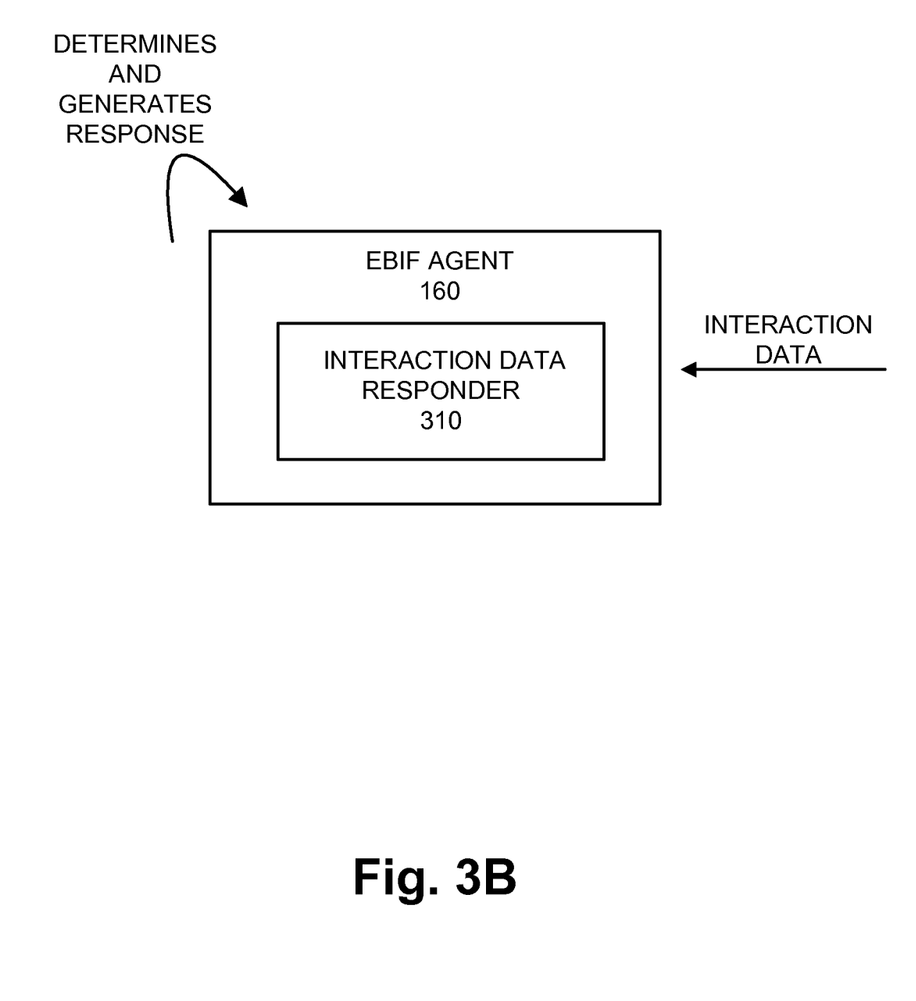
FIG. 3B is a diagram illustrating an exemplary process for determining a response to interaction data.

In step (13), EBIF agent 160 determines a response pertaining to the interaction data. For example, EBIF agent 160 interprets the interaction data to determine the response. FIG. 3B is a diagram illustrating an exemplary process performed by EBIF agent 160 to determine and generate a response to interaction data. According to an exemplary embodiment, EBIF agent 160 includes an interaction data responder 310. According to an exemplary implementation, interaction data responder 310 determines a response based on interaction data received from network device 120. For example, interaction data responder 310 interprets the interaction data to determine a response. Additionally, interaction data responder 310 may use information received from EBIF translator 305 (e.g., incoming EBIF data) to determine a response. By way of example, assume the user interface with which a user of user device 170 interacted pertains to a voting application. Interaction data responder 310 recognizes that the interaction data includes form data (e.g., associated with a submit button of an HTML page displayed as the user interface, which was included in the converted EBIF data). Based on this information, interaction data responder 310 recognizes that the interaction data is to be submitted to network device 115 (e.g., a voting application server to obtain votes from viewers of a program, etc.). As illustrated by step (14), EBIF agent 160 transmits interaction data to network device 115.

According to another example, interaction data responder 310 may interpret the interaction data and determine that EBIF agent 160 should perform another transcoding of EBIF data as a response. For example, program device 155 continues to receive a program transmission, in step (15). In this example, assume the user interface with which the user of user device 170 interacted pertains to a boxing match application that allows a user to obtain information about a boxer of a boxing match. Interaction data responder 310 recognizes that the interaction data includes certain events (e.g., that a boxing match and an OK button has been selected). Interaction data responder 310 may identify based on the EBIF data (e.g., the EBIF data already received and converted and/or incoming EBIF data) that the events require EBIF agent 160 to convert subsequent EBIF data to provide a next user interface, etc. As illustrated in step (16), EBIF agent (e.g., EBIF translator 305) converts EBIF data included in the program transmission of step (15), and a process continues in manner similar to that previously described. Depending on the capabilities of user device 170, a subsequent EBIF notification may or may not include another session identifier. For example, some user devices 170 may need to close the session with network device 120 and re-open a new session, while other user devices 170 may be able to keep alive the previously established session.

Figure 4:
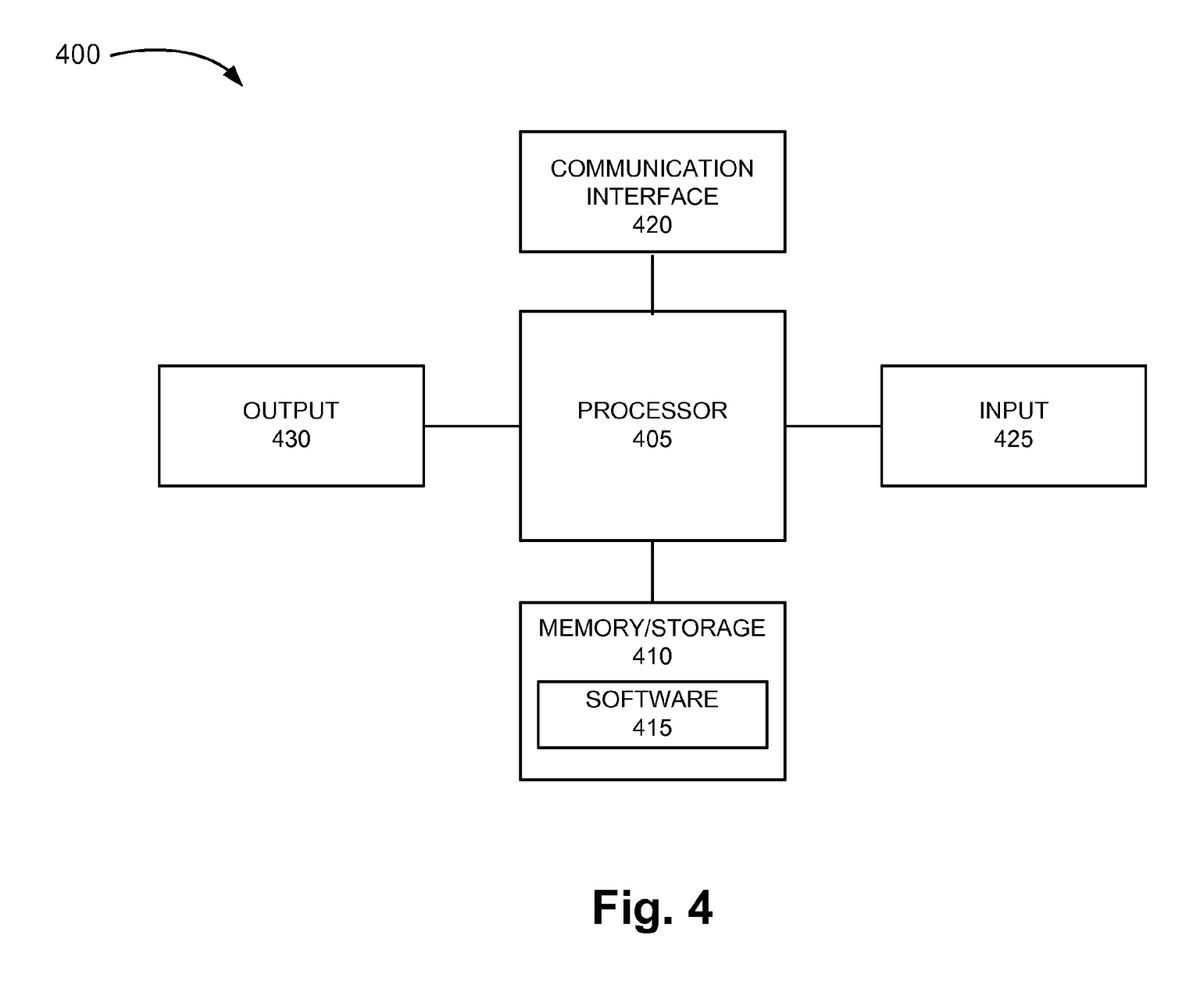
FIG. 4 is a diagram illustrating exemplary components of a device that may correspond to one or more of the devices previously depicted.

FIG. 4 is a diagram illustrating exemplary components of a device 400 that may correspond to one or more of the devices depicted in the previous Figures. As illustrated, according to an exemplary embodiment, device 400 may include a processor 405, memory/storage 410, software 415, a communication interface 420, an input 425, and an output 430. According to other embodiments, device 400 may include fewer components, additional components, different components, and/or a different arrangement of components than those illustrated in FIG. 4 and described herein.

Processor 405 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 210), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 may include one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 may include an application or a program that provides a function and/or a process. Software 415 may include firmware. For example, with reference to program device 155, EBIF agent 160 may be implemented as one or more program(s) and/or application(s). Additionally, for example, with reference to user device 170, one or more program(s) and/or application(s) may be used to display user interfaces, communicate with program device 155, etc. Additionally, for example, other devices may be implemented with software 415 to provide a function and/or a process described herein.

Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.), the execution of firmware with hardware, or the execution of software and firmware with hardware.

Figure 5A:
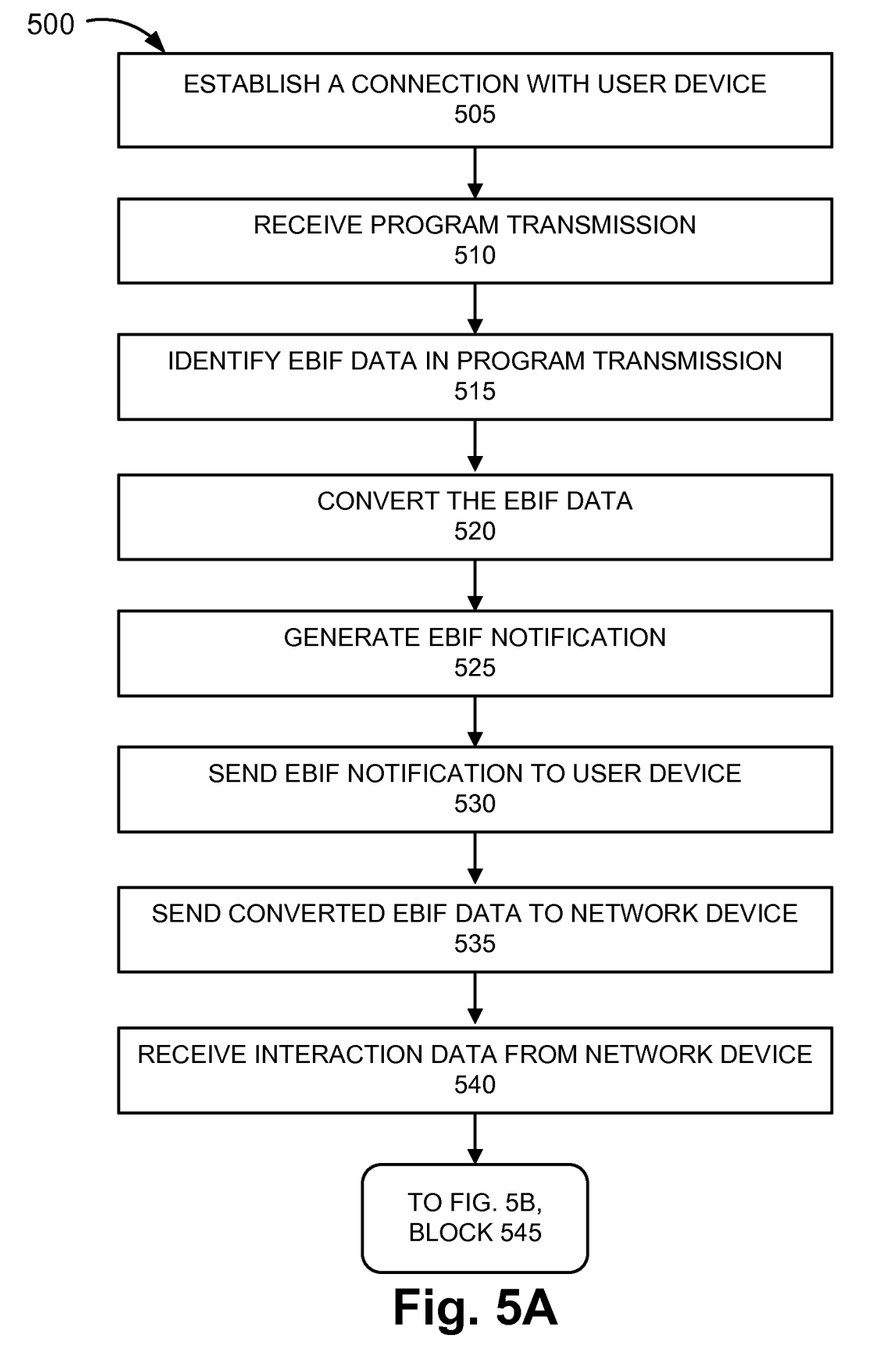
FIGS. 5A and 5B are flow diagrams illustrating an exemplary process pertaining to an exemplary embodiment of the interactive program system.
Figure 5B:
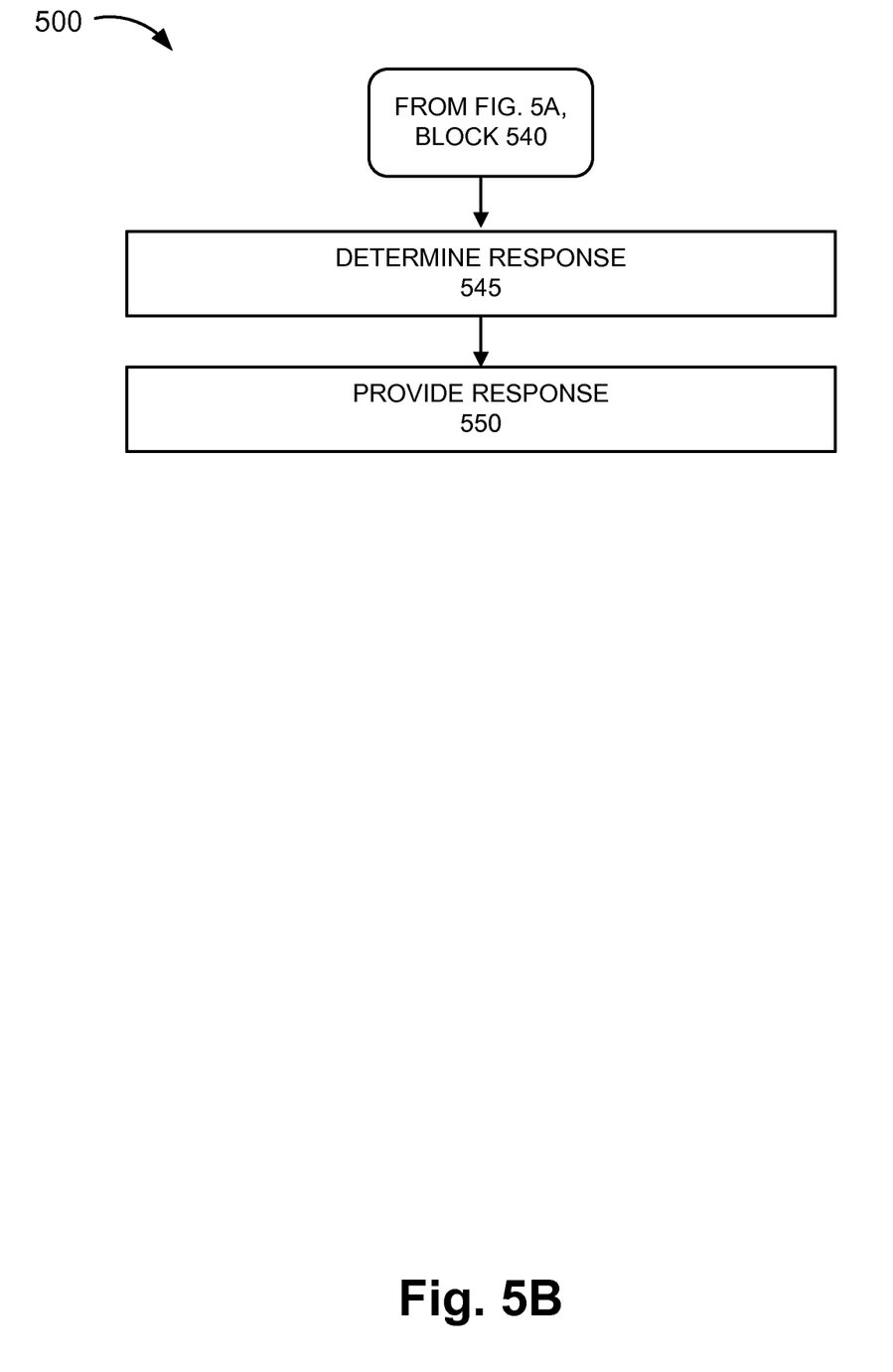

FIGS. 5A and 5B are flow diagrams illustrating an exemplary process 500 pertaining to an exemplary embodiment of an interactive program system. According to an exemplary embodiment, program device 155 including EBIF agent 160 performs one or more of the steps described in process 500. For example, processor 405 may execute software 415 to perform the steps described.

Referring to FIG. 5A, in block 505, a connection is established with a user device. For example, user device 170 initiates a connection with program device 155 to receive programs. According to an exemplary implementation, during the connection set-up, program device 155 may authenticate and authorize a user of user device 170 and/or user device 170.

In block 510, a program transmission is received. For example, program device 155 receives programs from a device (e.g., a media server) associated with a service provider (e.g., a television service provider, etc.). According to an exemplary implementation, the program transmission includes multiple channels (e.g., television channels, etc.).

In block 515, EBIF data is identified in the program transmission. For example, program device 155 receives the program transmission via tuners and one of the tuners is tuned to a channel for user device 170. EBIF agent 160 listens and identifies the presence of EBIF data.

In block 520, the EBIF data is converted. For example, EBIF agent 160 identifies the capabilities of user device 170 based on the connection set-up or other communications, messages, etc. EBIF agent 160 provides user device capability information and the EBIF data to EBIF translator 305. EBIF translator 305 converts the EBIF data into data format(s) that is/are compatible for user device 170, as previously described.

In block 525, an EBIF notification is generated and, in block 530, the EBIF notification is sent to the user device. For example, EBIF agent 160 generates an EBIF notification, which is compatible with user device 170, and sends the EBIF notification to user device 170. As previously described, according to an exemplary embodiment, the EBIF notification includes a URL that is hosted by network device 120. Additionally, according to an exemplary implement, the EBIF notification includes a session identifier. In block 535, the converted EBIF data is sent to a network device. For example, program device 155 sends the converted EBIF data to network device 120. According to an exemplary embodiment, network device 120 provides a Web service that hosts the converted EBIF data for display by user device 170.

In block 540, interaction data is received from the network device. For example, program device 155 receives interaction data from network device 120 stemming from a user's interaction with a user interface associated with an interactive application. According to an exemplary implementation, program device 155 also receives an identifier (e.g., a device identifier, etc.) associated with user device 170.

Referring to FIG. 5B, in block 545, a response to the interaction data is determined. For example, interaction data responder 310 of EBIF agent 160 determines a response. For example, as previously described, interactive data responder 310 may determine based on the interaction data, EBIF data, and/or converted EBIF data, whether to send the interaction data to network device 115 or to convert subsequently received EBIF data. In block 550, a response is provided. For example, program device 155 provides a response based on the determination.

Although FIGS. 5A and 5B illustrate an exemplary process 500 pertaining to the interactive program system, process 500 may include additional operations, fewer operations, and/or different operations than those illustrated in FIGS. 5A and 5B and described herein.

Figure 6:
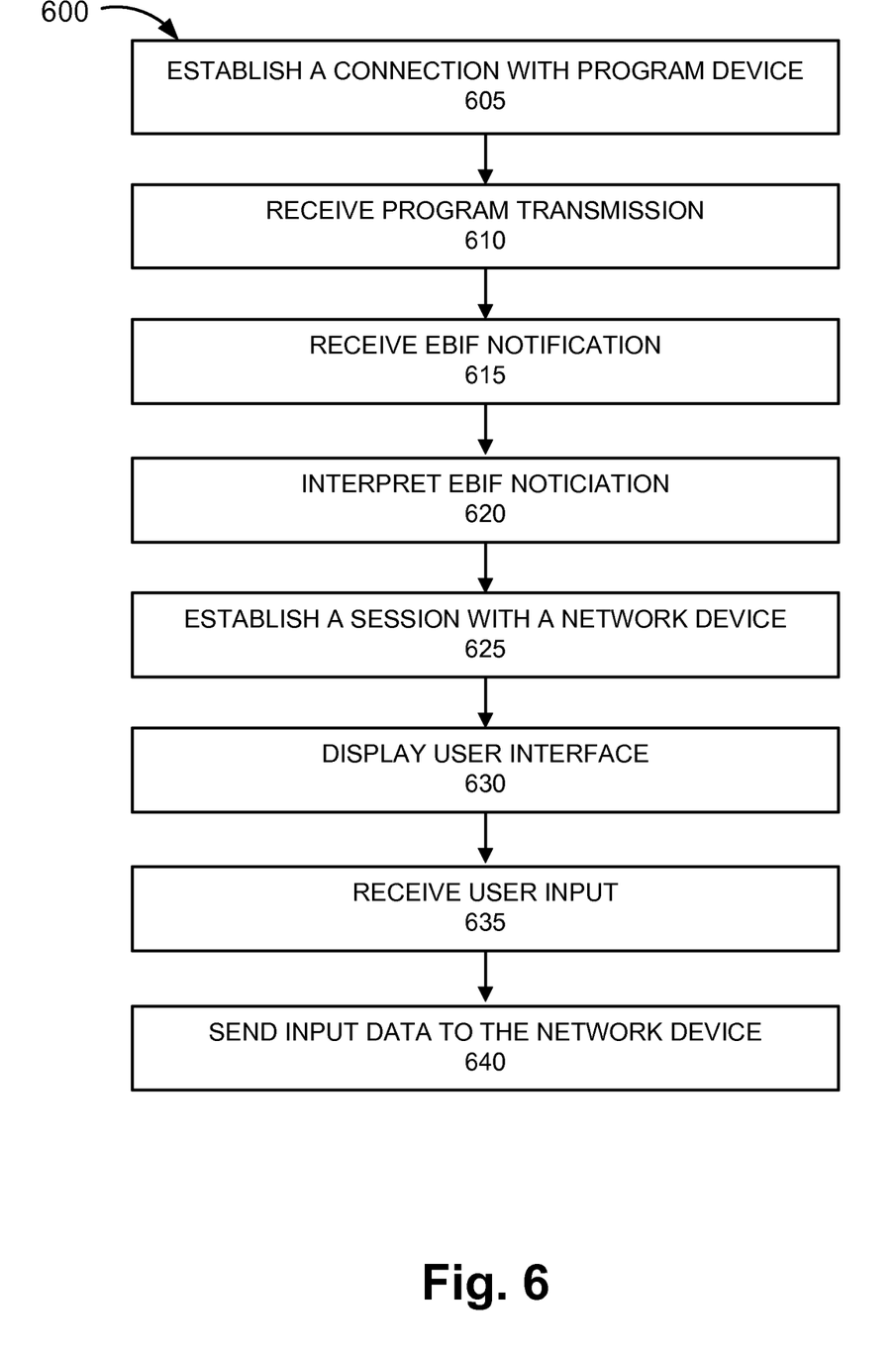
FIG. 6 is a flow diagram illustrating another exemplary process pertaining to an exemplary embodiment of the interactive program system.

FIG. 6 is a flow diagram illustrating another exemplary process pertaining to an exemplary embodiment of the interactive program system. According to an exemplary embodiment, user device 170 performs one or more of the steps described in process 600. For example, processor 405 may execute software 415 to perform the steps described.

Referring to FIG. 6, in block 605, a connection with a program device is established. For example, user device 170 establishes a connection with program device 155 to receive programs. According to an exemplary embodiment, user device 170 includes software (e.g., a client application, or other suitable application or program) that provides a communication link between user device 170 and program device 155. According to an exemplary implementation, a user of user device 170 and/or user device 170 may provide authentication and/or authorization information to program device 155.

In block 610, a program transmission is received. For example, user device 170 receives a program via program device 155. In block 615, an EBIF notification is received. For example, user device 170 receives an EBIF notification from program device 155. According to an exemplary embodiment, the EBIF notification includes a URL that is hosted by network device 120. Additionally, according to an exemplary implement, the EBIF notification includes a session identifier.

In block 620, the EBIF notification is interpreted. For example, user device 170 interprets the EBIF notification. For example, user device 170 identifies a URL in the EBIF notification. In response thereto, user device 170 initiates a communication with network device 120 based on the URL. Additionally, according to an exemplary implementation, the EBIF notification includes a session identifier.

In block 625, a session with a network device is established. For example, user device 170 establishes a session with network device 120, and in block 630, a user interface is displayed. For example, user device 170 includes a browser or other type of software to display a user interface that corresponds to (converted) EBIF data associated with an interactive application.

In block 635, a user input is received. For example, user device 170 receives a user input pertaining to the user interface, and in block 640, the input data is sent to the network device. For example, user device 170 sends the input data to network device 120.

Although FIG. 6 illustrates an exemplary process 600 pertaining to the interactive program system, process 600 may include additional operations, fewer operations, and/or different operations than those illustrated in FIG. 6 and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5A, 5B, and 6, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.), a combination of hardware and software (e.g., software 415), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive. By way of example, formats other than EBIF, may be implemented, such as, a proprietary format. Additionally, or alternatively, program device 155 may host the converted EBIF data.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   storing user device compatibility information that includes an equipment identifier of a user device, and wherein a data format compatible with the user device includes at least one of Hypertext Markup Language (HTML), JavaScript, Dynamic HTML, Cascading Style Sheet, HTML5, or Lua;

receiving a program transmission that includes program data and Enhanced TV Binary Interchange Format (EBIF) data associated with an interactive application;

identifying the EBIF data in the program transmission;

determining whether the EBIF data is compatible with the user device that is to receive the program transmission, wherein the determining comprises:

using the user device compatibility information to determine whether the EBIF data is compatible with the user device;

rendering the EBIF data via the user device, without conversion, in response to determining that the EBIF data is compatible with the user device;

converting the EBIF data to the data format compatible with the user device in response to determining that the EBIF data is not compatible with the user device;

generating an EBIF notification in response to determining that the EBIF data is not compatible with the user device, wherein the EBIF notification includes a Uniform Resource Locator of a network device that hosts the converted EBIF data and a session token;

transmitting the EBIF notification to the user device; and transmitting converted EBIF data to the network device.

2. The method of claim 1, wherein the identifying comprises identifying an EBIF packet identifier in the program transmission.

3. The method of claim 1, wherein the method further comprising:

receiving the EBIF notification by the user device;

establishing a session between the user device and the network device based on the Uniform Resource Locator and the session token; and displaying a user interface based on the converted EBIF data.

4. The method of claim 1, further comprising:

receiving the EBIF notification by the user device; and listening for a unicast communication or a multicast communication from the network device in response to receiving the EBIF notification.

5. The method of claim 1, further comprising:

receiving interaction data from the network device, wherein the interaction data includes user input data relating to a user interface displayed by the user device to a user of the user device, wherein the user interface is displayed based on the converted EBIF data.

6. The method of claim 5, further comprising:

determining a response to the interaction data; and providing the response to the interaction data.

7. The method of claim 6, wherein the determining the response further comprises:

determining that the interaction data is to be transmitted to another network device, and wherein the providing further comprises:

providing the interaction data to the other network device, wherein the other network device includes one of a voting device to obtain user votes or a polling device to obtain user opinions.

8. The method of claim 6, wherein the providing further comprises:

continuing to receive the program transmission;

identifying other EBIF data;

converting the other EBIF data;

generating another EBIF notification;

transmitting another EBIF notification to the user device; and transmitting the other converted EBIF data to the network device.

9. A device comprising:

a communication interface;

one or more memories that store instructions; and one or more processors to execute the instructions to:

store user device compatibility information that includes an equipment identifier of a user device, and wherein the data format compatible with the user device includes at least one of Hypertext Markup Language (HTML), JavaScript, Dynamic HTML, Cascading Style Sheet, HTML5, or Lua;

receive, via the communication interface, a program transmission that includes program data and Enhanced TV Binary Interchange Format (EBIF) data associated with an interactive application;

identify the EBIF data in the program transmission;

determine whether the EBIF data is compatible with a user device that is to receive the program transmission, wherein when determining, the one or more processors further execute the instructions to:

use the user device compatibility information to determine whether the EBIF data is compatible with the user device;

render the EBIF data via the user device, without conversion, in response to a determination that the EBIF data is compatible with the user device;

convert the EBIF data to the data format compatible with the user device in response to a determination that the EBIF data is not compatible with the user device;

generate an EBIF notification in response to the determination, wherein the EBIF notification includes a Uniform Resource Identifier of a network device that hosts the converted EBIF data and a session token;

transmit, via the communication interface, the EBIF notification to the user device; and transmit, via the communication interface, the converted EBIF data to the network device.

10. The device of claim 9, further comprising:

one or more tuners, wherein the one or more processors further execute the instructions to:

tune to a channel that includes the program data and the EBIF data.

11. The device of claim 9, wherein, when identifying, the one or more processors further execute the instructions to:

identify an EBIF packet identifier in the program transmission.

12. The device of claim 9, wherein the EBIF notification includes a port number associated with the network device.

13. The device of claim 9, wherein the one or more processors further execute the instructions to:

receive, via the communication interface, interaction data from the network device, wherein the interaction data includes user input data relating to a user interface displayed by the user device to a user of the user device, wherein the user interface is displayed based on the converted EBIF data.

14. The device of claim 13, wherein the one or more processors further execute the instructions to:

determine that the interaction data is to be transmitted to another network device; and provide the interaction data to the other network device, wherein the other network device includes one of a voting device to obtain user votes or a polling device to obtain user opinions.

15. The device of claim 13, wherein the one or more processors further execute the instructions to:
　determine a response to the interaction data, wherein the response includes the one or more processors further execute the instructions to:
　continue to receive the program transmission;
　identify other EBIF data;
　convert the other EBIF data;
　generate another EBIF notification;
　transmit another EBIF notification to the user device; and
　transmit the other converted EBIF data to the network device.

16. The device of claim 9, wherein the device includes a server and the user device includes a set top box.

17. A non-transitory storage medium storing instructions executable by a computational device, wherein the instructions comprise instructions to:
　store user device compatibility information that includes an equipment identifier of a user device, and wherein the data format compatible with the user device includes at least one of Hypertext Markup Language (HTML), JavaScript, Dynamic HTML, Cascading Style Sheet, HTML5, or Lua;
　receive a program transmission that includes program data and Enhanced TV Binary Interchange Format (EBIF) data;
　identify the EBIF data in the program transmission;
　determine whether the EBIF data is compatible with a user device that is to receive the program data, wherein when determining, the instructions comprise instructions to:
　use the user device compatibility information to determine whether the EBIF data is compatible with the user device;
　render the EBIF data via the user device, without conversion, in response to a determination that the EBIF data is compatible with the user device; and
　convert the EBIF data to the data format compatible with the user device in response to a determination that the EBIF data is not compatible with the user device;
　generate an EBIF notification in response to the determination, wherein the EBIF notification includes a network address of a network device that is to host the converted EBIF data and a session token; and
　transmit the EBIF notification to the user device.

18. The non-transitory storage medium of claim 17, wherein the instructions comprise instructions to:
　transmit the converted EBIF data to the network device.

19. The non-transitory storage medium of claim 17, wherein the instructions to identify comprise instructions to:
　identify an EBIF packet identifier in the program transmission.

\* \* \* \* \*